United States Patent
Sanchez et al.

(10) Patent No.: US 9,387,415 B2
(45) Date of Patent: Jul. 12, 2016

(54) PROCESS FOR UPGRADING BIOMASS DERIVED PRODUCTS USING LIQUID-LIQUID EXTRACTION

(71) Applicant: Inaeris Technologies, LLC, Pasadena, TX (US)

(72) Inventors: Vicente Sanchez, Houston, TX (US); Brent Moore, Friendswood, TX (US); Ed Smith, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 501 days.

(21) Appl. No.: 13/889,105

(22) Filed: May 7, 2013

(65) Prior Publication Data

US 2013/0306557 A1    Nov. 21, 2013

Related U.S. Application Data

(63) Continuation-in-part of application No. 13/212,861, filed on Aug. 18, 2011.

(51) Int. Cl.

| | | |
|---|---|---|
| *B01D 11/04* | (2006.01) | |
| *B01D 12/00* | (2006.01) | |
| *B01D 17/02* | (2006.01) | |
| *B01D 37/00* | (2006.01) | |
| *C10G 29/20* | (2006.01) | |
| *C10G 29/06* | (2006.01) | |
| *C10G 29/10* | (2006.01) | |
| *C10G 29/22* | (2006.01) | |
| *B01D 17/04* | (2006.01) | |
| *C10G 3/00* | (2006.01) | |
| *C10G 21/16* | (2006.01) | |
| *C10G 33/04* | (2006.01) | |

(52) U.S. Cl.
CPC ........ *B01D 11/0492* (2013.01); *B01D 17/0208* (2013.01); *B01D 17/042* (2013.01); *B01D 17/044* (2013.01); *B01D 17/047* (2013.01); *C10G 3/40* (2013.01); *C10G 3/42* (2013.01); *C10G 21/16* (2013.01); *C10G 29/06* (2013.01); *C10G 29/10* (2013.01); *C10G 29/20* (2013.01); *C10G 29/22* (2013.01); *C10G 33/04* (2013.01); *C10G 2300/1011* (2013.01); *C10G 2300/308* (2013.01); *Y02P 30/20* (2015.11)

(58) Field of Classification Search
CPC ........ B01D 12/00; B01D 12/02; B01D 17/02; B01D 17/0208; B01D 17/024; B01D 17/042; B01D 17/044; B01D 17/047; B01D 21/00; B01D 36/00; B01D 37/00; B01D 11/04; B01D 11/0488; B01D 11/0492; C10G 3/40; C10G 3/42; C10G 29/06; C10G 29/10; C10G 29/20; C10G 29/22; C10G 2300/1011; C10G 2300/308; C10G 21/16; C10G 33/04; C07C 1/20; C07C 7/005; C07C 7/001; Y02P 30/20

USPC ........ 210/634, 639, 808, 773, 774, 800, 804, 210/749; 44/307, 605, 606; 435/135, 435/161–165

See application file for complete search history.

(56) References Cited

U.S. PATENT DOCUMENTS

| | | |
|---|---|---|
| 4,147,593 A | 4/1979 | Frischmuth et al. |
| 4,299,690 A | 11/1981 | Allan |
| 4,304,649 A | 12/1981 | Han et al. |
| 4,405,448 A | 9/1983 | Googin et al. |
| 4,551,239 A | 11/1985 | Merchant et al. |
| 4,942,269 A | 7/1990 | Chum et al. |
| 4,960,507 A | 10/1990 | Evans et al. |
| 5,104,545 A | 4/1992 | Means et al. |
| 5,395,455 A | 3/1995 | Scott et al. |
| 5,792,340 A | 8/1998 | Freel et al. |
| 5,877,380 A | 3/1999 | Conroy et al. |
| 5,882,506 A | 3/1999 | Ohsol et al. |
| 5,922,206 A | 7/1999 | Darlington et al. |
| 6,007,702 A | 12/1999 | Schievelbein |
| 6,814,940 B1 | 11/2004 | Hiltunen et al. |
| 6,830,597 B1 | 12/2004 | Green |
| 7,004,999 B2 | 2/2006 | Johnson et al. |
| 7,319,168 B2 | 1/2008 | Sanada |
| 7,587,927 B2 | 9/2009 | Burke et al. |
| 8,075,642 B2 | 12/2011 | Dumesic et al. |
| 8,083,900 B2 | 12/2011 | Lin |
| 8,097,172 B2 | 1/2012 | Islam et al. |

(Continued)

FOREIGN PATENT DOCUMENTS

| | | |
|---|---|---|
| EP | 0718392 | 6/1996 |
| WO | WO0071494 | 11/2000 |
| WO | 0107537 | 2/2001 |
| WO | WO2009115888 | 3/2009 |
| WO | WO2009130392 | 10/2009 |
| WO | WO2010088486 | 1/2010 |
| WO | WO2010033789 | 3/2010 |
| WO | WO2011069510 | 6/2011 |
| WO | WO2011096912 | 8/2011 |

OTHER PUBLICATIONS

International Search Report and Written Opinion, mailed Jan. 2, 2013 in PCT/US2014/035804 filed Apr. 29, 2014.

(Continued)

*Primary Examiner* — Joseph Drodge
(74) *Attorney, Agent, or Firm* — Dunlap Codding, P.C.

(57) ABSTRACT

Disclosed is a process for the alteration of the ratio of the specific gravities of the oil and water phases resulting from the conversion of biomass to liquid products, the reduction of the conductivity and of metals of the product mixture, which each can aid in the removal of solids contained in the oil phase; and a liquid-liquid extraction method for partitioning desirable carbon containing compounds into the oil phase and undesirable carbon containing compounds into the water phase.

31 Claims, No Drawings

(56) References Cited

U.S. PATENT DOCUMENTS

| | | |
|---|---|---|
| 8,158,842 B2 | 4/2012 | McCall |
| 2003/0207407 A1 | 11/2003 | Buchanan et al. |
| 2007/0007188 A1 | 1/2007 | Skrypski-Mantele et al. |
| 2008/0006520 A1 | 1/2008 | Badger et al. |
| 2008/0217211 A1* | 9/2008 | Chornet et al. ............... 208/106 |
| 2008/0264771 A1 | 10/2008 | Dam-Johansen et al. |
| 2008/0312476 A1 | 12/2008 | McCall |
| 2009/0007484 A1 | 1/2009 | Smith |
| 2009/0054711 A1 | 2/2009 | Lawrence et al. |
| 2009/0119979 A1 | 5/2009 | Mullen |
| 2009/0124839 A1* | 5/2009 | Dumesic et al. ............. 585/251 |
| 2009/0139851 A1 | 6/2009 | Freel |
| 2009/0151233 A1 | 6/2009 | Miller |
| 2009/0165378 A1 | 7/2009 | Agblevor |
| 2009/0182166 A1 | 7/2009 | Kubatova et al. |
| 2009/0234146 A1* | 9/2009 | Cooney et al. ................ 554/174 |
| 2010/0076238 A1 | 3/2010 | Brandvold et al. |
| 2010/0083566 A1 | 4/2010 | Fredriksen et al. |
| 2010/0162625 A1 | 7/2010 | Mills |
| 2011/0146140 A1 | 6/2011 | Brandvold et al. |
| 2011/0245489 A1 | 10/2011 | Steele et al. |
| 2012/0005949 A1* | 1/2012 | Stevens et al. ................. 44/307 |
| 2012/0190872 A1 | 7/2012 | Cranford et al. |
| 2012/0289440 A1* | 11/2012 | Pollard et al. ................ 508/110 |
| 2012/0302765 A1* | 11/2012 | Dumesic ............. C07D 307/50 549/326 |
| 2012/0302767 A1* | 11/2012 | Dumesic ................ C07C 51/00 549/326 |
| 2013/0140216 A1* | 6/2013 | Wickes et al. ............... 208/188 |

OTHER PUBLICATIONS

Adjaye, et al.; Production of hydrocarbons by catalytic upgrading of a fast pyrolysis bio-oil. Part 1: Conversion over various catalysts; Fuel Processing Technology, vol. 45, Apr. 6, 1995, pp. 161-183.

Adjaye, et al.; Production of hydrocarbons by catalytic upgrading of a fast pyrolysis bio-oil. Part II: Comparative catalyst performance and reaction pathways; Fuel Processing Technology, vol. 45, Apr. 4, 1995; pp. 185-202.

Gerdes, et al.; Alternatives from Wood and Cellulose, Precoat Filtration with Organic Filter Aids; JRS Filtration & Separation; Dec. 1997; 6 pages; vol. 34, No. 10, ISSN 0015-1882.

Maximize Biodiesel Yields by Using Celite Filter Aids, Filtration, Dewatering, Dewaxing, and Winterization; World Minerals Americas and World Headquarters; 2009; 4 pages; Santa Barbara, California.

Qi et al.; Review of biomass pyrolysis oil properties and upgrading research; Energy Conversion and Management 48 (2007); 87-92, Jun. 22, 2006.

Elliott, et al.; Liquid Fuels by Low-Severity Hydrotreating of Biocrude, Developments in Thermochemical Biomass Conversion; vol. 1, pp. 611-621, A.V. Bridgewater and DGB Boocock, Blackie Academic & Professional, Longon: 1996.

Diebold et al.; Additives to Lower and Stabilize the Viscosity of Pyrolysis Oils during Storage; Energy fuels, 1997, 11 (5); pp. 1081-1091; Sep. 18, 1997.

International Application No. PCT/US12/50561; International Search Report; dated Jan. 2, 2013; 3 pages.

* cited by examiner

PROCESS FOR UPGRADING BIOMASS DERIVED PRODUCTS USING LIQUID-LIQUID EXTRACTION

BACKGROUND OF THE INVENTION

1. Field of the Invention

The invention relates generally to the alteration of the ratio of the specific gravities of the oil and water phases resulting from the conversion of biomass to liquid products, which can further include the removal of metals and/or the modification of the conductivity, and more particularly to an effective means to reduce the level of solids contained in the oil phase. The invention also relates to using liquid-liquid extraction to partition desirable carbon containing compounds into the oil phase and undesirable carbon containing compounds into the water phase.

2. Description of the Related Art

In the conversion of biomass to liquid products, the product stream can contain both an oil phase and a water phase (containing both water present in the biomass prior to conversion, and water produced during the conversion process). Pyrolysis, in particular flash pyrolysis, has been proposed as one such process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It is often the case that the oil phase has a higher specific gravity than the water phase, resulting in the oil phase settling to the bottom of a settling vessel, and emulsions can also form between the oil and water phases. As a result, any solids present in the reaction products also settle into the oil phase, which can cause issues in downstream processing of the oil, and can be difficult and expensive to remove.

Thus, there is a need for an improved system whereby the solids content of biomass derived oil is reduced.

In addition, undesirable carbon containing compounds such as aldehydes and carboxylic acids can be present in the liquid product and such are not easily upgradable to transportation fuels. Such undesirable carbon containing compounds can be present in the oil phase while desirable carbon containing compounds can be present in the water phase, thus lowering the yield of high quality bio-oil for upgrading to fuels. Thus, there is also a need for an improved system whereby undesirable carbon containing compounds are transferred from the oil phase to the water phase and desirable carbon containing compounds are transferred from the water phase to the oil phase.

BRIEF SUMMARY OF THE INVENTION

In accordance with an embodiment of the present invention, a process is provided comprising:
- a) providing a first mixture including a first oil phase comprising biomass derived carbon containing compounds and a first aqueous phase comprising water; wherein the ratio of the specific gravities of the first oil phase to the first aqueous phase (SGR1) is greater than 1.0;
- b) modifying the specific gravity of at least one of the first oil phase and the first aqueous phase, thereby resulting in a second mixture having a second oil phase and a second aqueous phase, wherein the ratio of the specific gravities of the second oil phase to the second aqueous phase (SGR2) is less than 1.0; and
- c) separating the second oil phase from the second aqueous phase.

In accordance with another embodiment of the present invention, such process can additionally comprise:
- combining at least one specific gravity modifier comprising a diluent with the first oil phase, thereby forming the second oil phase, and wherein the specific gravity of the second oil phase is lower than the specific gravity of the first oil phase.

In accordance with another embodiment of the present invention, such process can additionally comprise:
- combining at least one specific gravity modifier comprising a water-soluble compound with the first aqueous phase, thereby forming the second aqueous phase, and wherein the specific gravity of the second aqueous phase is higher than the specific gravity of the first aqueous phase.

In accordance with another embodiment of the present invention, such process can additionally comprise:
- combining at least one specific gravity modifier comprising a water soluble co-solvent with the first aqueous phase, thereby forming the second aqueous phase, and wherein the specific gravity of the second aqueous phase is higher than the specific gravity of the first aqueous phase.

In accordance with another embodiment of the present invention, such process can additionally comprise:
- combining at least one specific gravity modifier comprising a diluent, a water-soluble compound, a water soluble co-solvent, and combinations thereof, with the first mixture, thereby forming the second oil phase and the second aqueous phase.

In accordance with another embodiment of the present invention, such process can additionally comprise:
- allowing the second mixture to settle, thereby forming an upper layer containing the second oil phase and a lower layer containing the second aqueous phase, wherein the first oil phase contains solids, and following the settling, the second oil phase in the upper layer contains less solids than the first oil phase.

In accordance with another embodiment of the present invention, such process can additionally comprise:
- adding a quantity of a conductivity modifier to the first mixture thereby forming the second mixture, wherein the conductivity modifier can have a TAN lower than the TAN of the first mixture, and wherein the quantity of conductivity modifier is sufficient such that the electrical conductivity of the second mixture is lower than the electrical conductivity of the first mixture.

In accordance with another embodiment of the present invention, wherein the first and/or second oil phases further contain metals, a process is provided comprising:
- contacting either the first and/or second mixtures with specific acids for removal of at least a portion of the metals from either or both of the first and second oil phases.

In accordance with another embodiment of the present invention, a method is provided comprising:
- a) contacting an extraction solvent with a first mixture comprising water and biomass derived carbon containing compounds including organics A comprising compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising compounds having at least four carbon atoms per molecule, thereby forming a second mixture comprising an extract and a raffinate, wherein the organics B are substantially free of: i) aldehydes, ii) ketones having from 3 to 4 carbon atoms per molecule, and iii) carboxylic acids having from 2 to 3 carbon atoms per molecule, wherein the extract and the raffinate are immiscible, the extract comprises substantially all of the extraction solvent and substantially all of the organics B, the raffinate comprises substantially all of the water and substantially all of the organics A, and wherein the extraction solvent has a dipole moment greater than about 1.0 debye, a density less than about 1.0, a water solubility at 20° C. of less than about 2.5 g/100 ml of water, and a boiling point in the range of from about 90 to about 300° F.;

b) separating the second mixture thereby forming an intermediate product stream comprising at least a portion of the extract and a waste water stream comprising substantially all of the raffinate; and c) removing at least a portion of the extraction solvent from the intermediate product stream forming a recovered extraction solvent and a bio-oil product.

In accordance with another embodiment of the present invention, a method is provided comprising:

a) providing a first mixture comprising water and biomass derived carbon containing compounds including organics A comprising carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising carbon containing compounds having at least four carbon atoms per molecule, wherein organics B are substantially free of the organics A, and wherein the first mixture includes i) a first oil phase comprising at least a portion of the biomass derived carbon containing compounds and at least a portion of the water and ii) a first aqueous phase comprising at least a portion of the water and at least a portion of the biomass derived carbon containing compounds, wherein the first oil phase and the first aqueous phase are immiscible;

b) contacting the first mixture with an extraction solvent thereby forming a second mixture comprising a second oil phase and a second aqueous phase; wherein substantially all of the organics A present in the first oil phase are partitioned from the first oil phase to the first aqueous phase and substantially all of the organics B present in the first aqueous phase are partitioned from the first aqueous phase to the first oil phase, thereby forming the second oil phase comprising substantially all of the organics B and substantially all of the extraction solvent and the second aqueous phase comprising substantially all of the water and substantially all of the organics A, wherein the second oil phase and the second aqueous phase are immiscible, and wherein the extraction solvent has a dipole moment greater than about 1.0 debye, a density less than about 1.0, a water solubility at 20° C. of less than about 2.5 g/100 ml of water, and a boiling point in the range of from about 90 to about 300° F.; and c) separating the second mixture thereby forming an intermediate product stream comprising at least a portion of the second oil phase and a waste water stream comprising substantially all of the second aqueous phase.

DETAILED DESCRIPTION OF THE INVENTION

The biomass material useful in the current invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be converted, by any suitable means, to reaction products comprising, at least in part, a first mixture comprising, consisting of, or consisting essentially of water and biomass derived carbon containing compounds which can include organics A comprising carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising carbon containing compounds having at least four carbon atoms per molecule. The carbon containing compounds of the organics B can be selected from the group consisting of ketones, furans, phenols, catechols, aromatics hydrocarbons (such as, but not limited to, alkyl benzenes and naphthalenes), indenols, indanols, naphthalenos, benzofurans, and combinations thereof. The first mixture can also comprise i) a first oil phase (also referred to as bio-oil) comprising, consisting of, or consisting essentially of at least a portion of the biomass derived carbon containing compounds and at least a portion of the water and ii) a first aqueous phase (also referred to as process water) comprising, consisting of, or consisting essentially of at least a portion of the water and at least a portion of the biomass derived carbon containing compounds. The first oil phase (or bio-oil) of the reaction products can comprise at least about 8 wt % water. The first oil phase and the first aqueous phase can be immiscible. The biomass conversion can be by a method including, but not limited to, fast pyrolysis, catalytic pyrolysis, and hydrothermal conversion, each at elevated temperatures. The temperatures can range from 300 to 1000 C., or 400 to 700 C. The first mixture can have a Total Acid Number (TAN) of at least about 2, or at least about 3, or at least about 10, or at least about 20, or at least about 30.

The biomass feed can be charged to a reaction zone along with a heat carrier material and/or a catalyst for mixture with the biomass feed and to transfer heat thereto. Useful catalysts for this process include those containing catalytic acidity and preferably containing zeolite. The biomass feed can be converted to reaction products comprising, consisting of, or consisting essentially of the first mixture described above, and optionally light gases and/or char. The reaction products can be removed from the reaction zone and the first mixture condensed therefrom. The first mixture can also comprise, consist of, or consist essentially of a first oil phase comprising, consisting of, or consisting essentially of biomass derived carbon containing compounds, and a first aqueous phase comprising, consisting of, or consisting essentially of water, and solids. The solids can include dissolved or suspended solids and can be catalyst fines, char, unreacted biomass and ash. The first oil phase can comprise at least a portion of the biomass derived carbon containing compounds and at least a portion of the water. The first aqueous phase can comprise at least a portion of the water and at least a portion of the biomass derived carbon containing compounds and at least a portion of the solids.

Specific Gravity Modification

The ratio of the specific gravities of the first oil phase to the first aqueous phase (SGR1) can be greater than 1.0, greater than about 1.05, or greater than about 1.1. The specific gravity of at least one of the first oil phase and the first aqueous phase can be modified, thereby resulting in a second mixture having a second oil phase and a second aqueous phase, wherein the ratio of the specific gravities of the second oil phase to the second aqueous phase (SGR2) is less than 1.0, preferably less than about 0.99, and more preferably less than about 0.97.

The modification of the specific gravity of at least one of the first oil phase and the first aqueous phase can include adding at least one specific gravity modifier to the mixture, thereby forming the second mixture.

A diluent can be combined with the first oil phase, as at least a portion of the specific gravity modifier, thereby forming the second oil phase, resulting in the specific gravity of the second oil phase being lower than the specific gravity of the first oil phase. More particularly, the specific gravity of the second oil phase is less than 1.0. The diluent preferably has a specific gravity less than about 0.97. The diluent can be selected from the group consisting of: light cycle oil, naphtha, toluene, methyl isobutyl ketone, reformate, a bio-oil fraction having a specific gravity lower than the specific gravity of the first oil phase, a hydrotreated bio-oil fraction having a specific gravity lower than the specific gravity of the first oil phase, and combinations thereof.

The bio-oil fraction can be obtained as a fraction of the first oil phase following the specific gravity modification step. The hydrotreated bio-oil fraction can optionally be obtained as a fraction of the first oil phase following hydrotreatment of the first oil phase.

The ratio by volume of the diluent to the first oil phase can be in the range of from about 0.6:1 to about 2.4:1, and more preferably from about 0.6:1 to about 1:1. When light cycle oil is used as the diluent, the ratio by volume of the diluent to first oil phase can be in the range of from about 0.05:1 to about 1:1, or from about 0.05:1 to about 0.2:1.

The modification of the specific gravity of at least one of the first oil phase and the first aqueous phase can also include combining a water-soluble compound, as at least a portion of the specific gravity modifier (alone or in addition to the use of a diluent as a specific gravity modifier), with the first aqueous phase, thereby forming the second aqueous phase, and wherein the specific gravity of the second aqueous phase is higher than the specific gravity of the first aqueous phase. Preferably, the specific gravity of the second aqueous phase ends up being greater than about 1.05. The water-soluble compound can be selected from the group consisting of NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, and combinations thereof.

The water-soluble compound can be added as a solid and dissolved into the first aqueous phase, and can also, alternatively, be added in the form of a water-soluble compound solution. The water-soluble compound is preferably ammonium bicarbonate, NaCl, or $MgCl_2$. The water-soluble compound is preferably combined with the first aqueous phase in a quantity sufficient to result in a specific gravity of the second aqueous phase which is greater than about 1.05.

The modification of the specific gravity of at least one of the first oil phase and the first aqueous phase can also include combining a water-soluble co-solvent, as at least a portion of the specific gravity modifier (alone or in addition to the use of one or both of the diluent or water-soluble compound as specific gravity modifiers), with the first aqueous phase, thereby forming the second aqueous phase, and wherein the specific gravity of the second aqueous phase is higher than the specific gravity of the first aqueous phase. The water soluble co-solvent can be a glycol, and more preferably, is selected from the group consisting of ethylene glycol, polyethylene glycol, propylene glycol, polypropylene glycol, and combinations thereof. The resulting specific gravity of the second aqueous phase is preferably greater than about 1.05.

More generally, the at least one specific gravity modifier added to the first mixture can also be selected from the group consisting of a light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, a glycol, and combinations thereof.

The second mixture is preferably allowed to settle in a settling vessel, thereby forming an upper layer containing the second oil phase and a lower layer containing the second aqueous phase. The first oil phase can contain solids, which can be present in an amount of at least about 100, or about 1000, or about 3,000 ppmw. The solids can include, but are not limited to, organic and inorganic components, which can include solid catalyst material. Following the settling of the second mixture, the second oil phase in the upper layer contains less solids than the first oil phase; and can contain less than about 25, or about 10, or about 5 wt % of the solids contained in the first oil phase; and preferably contains less than about 80 ppmw solids.

When a diluent is used as at least one specific gravity modifier, at least a portion of the second oil phase in the upper layer can be passed to a separator for recovery of at least a portion of the diluent, resulting in a recovered diluent. At least a portion of the recovered diluent can be recycled for use as at least a portion of the diluent.

Additionally, when a diluent is used as at least one specific gravity modifier, at least a portion of the second oil phase can be passed to a separator for recovery of at least one bio-oil fraction from the second oil phase. At least one of the bio-oil fractions can be utilized, as at least a portion of the diluent.

Further, when a diluent is used as at least one specific gravity modifier, at least a portion of the second oil phase can be passed to a hydrotreater for at least partial hydrotreating, thereby forming a hydrotreated stream, and at least a portion of the hydrotreated stream can be passed to a separator for separation into at least one hydrotreated bio-oil fraction. At least one of the hydrotreated bio-oil fractions can be utilized as at least a portion of the diluent.

Conductivity Modification

Alternatively, a quantity of a conductivity modifier can also be added to the first mixture thereby forming the second mixture, wherein the quantity of the conductivity modifier is sufficient such that the electrical conductivity of the second mixture is lower than the electrical conductivity of the first mixture. The first mixture can have an electrical conductivity of at least about 900,000, or at least about 950,000 nano Siemens per meter (nS/m); and the second mixture preferably has an electrical conductivity less than about 800,000 or less than about 500,000 nS/m. In one embodiment, the conductivity modifier can have a TAN lower than the TAN of the first mixture, and preferably has a TAN at least about 2 units lower than the TAN of the first mixture. The electrical conductivity of the second mixture is preferably less than about 75%, more preferably less than about 50%, and even more preferably less than about 25% of the electrical conductivity of the first mixture.

The conductivity modifier can be selected from the group consisting of an aqueous solution, a fraction separated from the biomass derived carbon containing compounds, a fraction separated from the biomass derived carbon containing compounds following hydrotreatment of the biomass derived carbon containing compounds, and combinations thereof. The conductivity modifier can comprise an aqueous solution having a pH greater than 7 or greater than about 9. The aqueous solution can comprise a base selected from the group consisting of NaOH, KOH, $NH_4OH$, alkyl amines, pyridines, quinolines, ammonia, ammonium compounds including: nitrates, sulfides, carbonates, hydroxides, acetates, chlorides, bromides, iodides, and sulfates, and combinations thereof, and is preferably ammonium bicarbonate or ammonium hydroxide or a combination thereof. Combinations of bases can be added separately or simultaneously as a pre-mixed solution. If added separately, they can be added at different process conditions including different temperature and different pressures. Buffers may also be used to more tightly control pH.

In addition, at least a portion of the first mixture and/or the resulting second mixture can be in the form of an emulsion comprising a portion of the biomass derived carbon containing compounds and a portion of the water. The second mixture, including the conductivity modifier described above, can be subjected to electrostatic dehydration, resulting in at least a partial breaking of the emulsion, and freeing from the emulsion at least 75%, or at least 90%, or at least 95% of the biomass derived carbon containing compounds contained in the emulsion or at least 50%, or at least 70%, or at least 95% of the water contained in the emulsion. Also, the second mixture, following electrostatic dehydration, preferably has an electrical conductivity less than about 250,000 nS/m. The electrostatic dehydration is preferably performed in a desalter vessel. Also, a demulsifier compound can be added to the first mixture, along with the conductivity modifier, thereby forming the second mixture which is then subjected to the electrostatic dehydration. The demulsifier can be an alkoxylate derived from a poly amine.

Acid Treatment

In addition, the first and second oil phases can each further comprise metals, which can be selected from the group consisting of Al, Ca, Mg, Si, Fe, and combinations thereof. At least a portion of these metals can be removed from either the first oil phase or the second oil phase, or both, into either the first or second aqueous phases by contact of either or both of the first mixture and the second mixture with certain acids. If metals are removed from the first oil phase into the first aqueous phase by contact with such acid(s), the conductivity modifier can then optionally be added to form the second mixture, having a reduced electrical conductivity, as described above. The removal of at least a portion of the metals can also take place from the second oil phase into the second aqueous phase following addition of the conductivity modifier, and also optionally, before or after the electrostatic dehydration of the second mixture to at least partially break the emulsion, as described above.

The acid can be selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, alpha-hydroxy carboxylic acids, and their salts, and combinations thereof. The acid also preferably has a pH less than about 5.

The acid and metal interaction can include, but is not limited to, a process selected from the group consisting of: chemically binding at least a portion of the metals; removing at least a portion of the metals from the first and or second oil phases; or combinations thereof.

Liquid-Liquid Extraction

Alternatively, the first mixture can be contacted with an extraction solvent thereby forming a second mixture comprising an extract and a raffinate, wherein the extract and raffinate are immiscible. The organics B described above can be substantially free of i) aldehydes, ii) ketones having from 3 to 4 carbon atoms per molecule, and iii) carboxylic acids having from 2 to 3 carbon atoms per molecule. The term "substantially free" as used herein means less than 5, or 3, or 2, or 1, or 0.5, or 0.1 wt %. The extract can comprise substantially all of the extraction solvent and substantially all of the organics B, and the raffinate can comprise substantially all of the water and substantially all of the organics A. The term "substantially all" as used herein means at least 85, or 90, or 95, or 98, or 100 wt %. The extraction solvent can have a dipole moment greater than about 1.0 or greater than about 2.0 or greater than about 4.0 debye; a density less than about 1.0 or less than about 0.9 or less than about 0.8; a water solubility at 20° C. of less than about 2.5 or less than about 2.2 or less than about 2.0 g/100 ml of water; and a boiling point in the range of from about 90 to about 300° F. or from about 200 to about 270° F. or from about 200 to about 260° F. The extraction solvent can be substantially unreactive when exposed to acidic aqueous media and substantially thermally stable at temperatures up to about 500° F. Also, the extraction solvent can comprise a member selected from the group consisting of methyl isobutyl ketone, cyclopentyl-methyl-ether, and combinations thereof.

The second mixture can then be separated thereby forming an intermediate product stream comprising at least a portion of, or substantially all of, the extract and a waste water stream comprising substantially all of the raffinate. At least a portion of the extraction solvent can be removed from the intermediate product stream forming a recovered extraction solvent and a bio-oil product, and the recovered extraction solvent can be recycled as at least a part of the extraction solvent contacted with the first mixture, as described above.

The viscosity of the second mixture is lower than the viscosity of the first mixture making it easier to filter. The second mixture can be filtered to remove at least a portion of the solids therefrom prior to the separation of the second mixture. In addition, the partition coefficients of the organics A for the extract and the raffinate can each be less than about 1.0 or less than about 0.7, and the partition coefficients of the organics B for the extract and the raffinate can each be greater than about 1.0 or greater than about 2.0.

The bio-oil product can comprise less than about 1.0 or less than about 0.8 or less than about 0.5 wt % of the organics A, and can comprise less than about 1 or less than about 0.5 wt % water. Having a lower water content in the bio-oil product aids in any subsequent hydrodeoxygenation by both allowing increased volume throughput in the unit and increased hydrodeoxygenation activity due to an equilibrium shift (given that water is a product of hydrodeoxygenation). The waste water stream separated from the second mixture can comprise less than about 0.1 or less than about 0.05 wt % of the organics B.

The first aqueous phase (process water) can be separated from the reaction products described above to form the first mixture, or the reaction products can be used as the first mixture. The first mixture can be counter-currently or cross-currently contacted with the extraction solvent. Also, the contacting of the first mixture with the extraction solvent can be in a manner such that the second mixture is formed as a static mixture, with separation of the second mixture by decanting.

In accordance with another embodiment, the first mixture can be contacted with the extraction solvent thereby forming an extraction mixture comprising an extraction oil phase and an extraction aqueous phase. Substantially all of the organics A present in the first oil phase can be partitioned from the first oil phase to the first aqueous phase and substantially all of the organics B present in the first aqueous phase can be partitioned from the first aqueous phase to the first oil phase, thereby forming the extraction oil phase comprising, consisting of, or consisting essentially of substantially all of the organics B and substantially all of the extraction solvent and the extraction aqueous phase comprising, consisting of, or consisting essentially of substantially all of the water and substantially all of the organics A. The extraction oil phase and the extraction aqueous phase can be immiscible. The extraction mixture can be separated thereby forming an intermediate product stream described above comprising at least a portion of, or substantially all of, the extraction oil phase and a waste water stream comprising substantially all of the extraction aqueous phase. At least a portion of the extraction solvent can be removed from the intermediate product stream forming a recovered extraction solvent and a bio-oil product, and the recovered extraction solvent can be recycled as at least a part of the extraction solvent contacted with the first mixture, as described above.

The viscosity of the extraction mixture is lower than the viscosity of the first mixture making it easier to filter. The extraction mixture can further comprise solids and can be filtered to remove at least a portion of such solids therefrom prior to the separation of the extraction mixture. In addition, the partition coefficients of the organics A for the extraction oil phase and the extraction aqueous phase can each be less than about 1.0 or less than about 0.7, and the partition coefficients of the organics B for the extraction oil phase and the extraction aqueous phase can each be greater than about 1.0 or greater than about 2.0.

The bio-oil product can comprise less than about 1.0 or less than about 0.8 or less than about 0.5 wt % of the organics A, and can comprise less than about 1 or less than about 0.5 wt % water. Having a lower water content in the bio-oil product aids in any subsequent hydrodeoxygenation by both allowing increased volume throughput in the unit and increased hydrodeoxygenation activity due to an equilibrium shift (given that water is a product of hydrodeoxygenation). The waste water stream separated from the extraction mixture can comprise less than about 0.1 or less than about 0.05 wt % of the organics B.

The first aqueous phase (process water) can be separated from the reaction products described above to form the first mixture, or the reaction products can be used as the first mixture. The first mixture can be counter-currently or cross-currently contacted with the extraction solvent. Also, the contacting of the first mixture with the extraction solvent can be in a manner such that the second mixture is formed as a static mixture, with separation of the second mixture by decanting.

The following examples are provided to further illustrate this invention and are not to be considered as unduly limiting the scope of this invention.

EXAMPLES

Example I

A product mixture produced from the thermo-catalytic pyrolysis of southern yellow pine wood chips was collected and allowed to settle. The organic phase (raw bio-oil) for the product mixture settled to a position below the water phase. A 45 ml. quantity of the raw bio-oil, separated from the product mixture, was mixed with a 45 ml. quantity of an un-hydrotreated bio-naphtha fraction of the bio-oil (bio-naphtha). A 10 ml. quantity of process water separated from the product mixture was also added to the raw bio-oil and bio-naphtha. A total of twenty four (24) 100 ml. samples were prepared in this way. The resulting samples were each mixed for around 20 seconds and placed in a 140 F water bath for around 1 hour. Upon settling, the organic phase (blended bio-oil) layer for each sample was flipped and on top, with the water phase on the bottom of the containers. The blended bio-oil for each sample was then extracted and all extracted blended bio-oils combined in one container. The container was then mixed for around 20 seconds and an aliquot was tested for filterable solids through a 0.2 µm PVDF membrane filter. A sample of the raw bio-oil separated from the product mixture was also tested for filterable solids through a 0.2 µm PVDF membrane filter. The amount of solids in the blended (flipped) bio-oil was about 610 ppm (with 1220 ppm attributed to the raw bio-oil portion), compared to about 3,558 ppm for the un-flipped raw bio-oil.

As can be seen from the data above, the solids content in the bio-oil drops significantly once the oil and water layers are flipped. This provides substantial benefits for downstream processing of the bio-oil, such as hydrotreatment, and significantly reduces the cost of any subsequently required solids removal.

Example II

A product mixture produced from the thermo-catalytic pyrolysis of southern yellow pine wood chips was collected and allowed to settle. The organic phase (raw bio-oil) for the product mixture settled to a position below the water phase. A 100 ml. quantity of the raw bio-oil, separated from the product mixture, was mixed with a 100 ml. quantity of an un-hydrotreated bio-naphtha fraction of the raw bio-oil. The 200 ml. bio-oil/bio-naphtha mixture was split into four samples. Each of the four samples was combined with 50 ml. quantities of process water separated from the product mixture. Three different demulsifier additives were added to three of the samples. The four samples were each mixed for around 20 seconds and placed in a 140 F water bath for around 30 minutes. The organic phase (blended bio-oil) layer for each sample was flipped and on top, with the water phase on the bottom of the containers. The blended bio-oil for each sample was then extracted. Each of the four extracted blended bio-oils were mixed for around 20 seconds, and aliquots of each were tested for filterable solids through a 0.2 µm PVDF membrane filter. The amount of solids contained in the three blended (flipped) bio-oil samples including desalter additives were about 205, 193, and 400 ppm; and the amount of solids contained in the blended (flipped) bio-oil sample not including a desalter additive was about 492 ppm. The desalter additives used were from Champion Technologies and designated as XZ-1677, Code 80 and EC-1-C, respectively.

Example III

A product mixture produced from the thermo-catalytic pyrolysis of southern yellow pine wood chips was collected and allowed to settle. The organic phase (raw bio-oil) for the product mixture settled to a position below the water phase. A quantity of the total product mixture was mixed with a quantity of a Light Cycle Oil (LCO) obtained from a crude oil refinery. The product mixture/LCO mixture was vigorously mixed for around 30 seconds. The product mixture/LCO mixture was then centrifuged to separate out the blended bio-oil. The blended bio-oil, as well as a sample of the raw bio-oil from the product mixture, were then tested for ash content. The ash content of the blended bio-oil was only about 0.007 wt %, compared to about 0.146 wt % for the control raw bio-oil.

As can be seen from the data above, the ash content in the bio-oil drops significantly once the oil and water layers are flipped.

Example IV

A product mixture produced from the thermo-catalytic pyrolysis of southern yellow pine wood chips was collected and allowed to settle. The organic phase (raw bio-oil, pH of about 4.5) for the product mixture settled to a position below the product water phase (pH of about 4-5). Three separate quantities of the total product mixture were mixed with quantities of LCO sufficient such that the resulting organic phases of the mixtures contained about 5 wt %, about 10 wt %, and about 20 wt % LCO, respectively. The density of the product water portions of the three mixtures were also modified by adding NaCl such that the resulting product water for each mixture contained about 2M NaCl. For each of the mixtures, the organic phase (blended bio-oil) layer was flipped and on top, with the 2M NaCl product water phase on the bottom of the container. The density of the bio-oil vs. percent of LCO added is shown in Table 1 below.

TABLE 1

| | % LCO in blended bio-oil | | | |
|---|---|---|---|---|
| | 0 | 5 | 10 | 20 |
| Blended bio-oil Density (g/ml) | 1.10 | 1.08 | 1.07 | 1.05 |

Example V

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). NaCl was added to five of the bio-oil/water mixtures such that the distilled water portions separately contained about 1M NaCl, about 2M NaCl, about 3M NaCl, about 4M NaCl, and about 5M NaCl, respectively. For each of the 3M, 4M, and 5M NaCl mixtures, the organic phase (blended bio-oil) layer was clearly flipped and on top, with the water phase on the bottom of the container. For the 2M NaCl mixture, the layers were mostly, but not completely, flipped, and the layers were not flipped for the 1M NaCl mixture.

Example VI

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). $MgCl_2$ was added to five of the bio-oil/water mixtures such that the distilled water portions separately contained about 1M $MgCl_2$, about 2M $MgCl_2$, about 3M $MgCl_2$, about 4M $MgCl_2$, and about 5M $MgCl_2$, respectively. For each of the 3M, 4M, and 5M $MgCl_2$ mixtures, the organic phase (blended bio-oil) layer was clearly flipped and on top, with the water phase on the bottom of the container. For the 2M $MgCl_2$ mixture, the layers were partially flipped, and the layers were not flipped for the 1M $MgCl_2$ mixture.

Example VII

A product mixture produced from the thermo-catalytic pyrolysis of southern yellow pine wood chips was collected and allowed to settle. The organic phase (raw bio-oil, pH of about 4.5, density of about 1.085) for the product mixture settled to a position below the product water phase (pH~4-5). The product mixture was separated into six quantities. NaCl was added to five of the product mixture samples such that those five product water portions separately contained about 1M NaCl, about 2M NaCl, about 3M NaCl, about 4M NaCl, and about 5M NaCl, respectively. For each of the 3M, 4M, and 5M NaCl mixtures, the organic phase layer was clearly flipped and on top, with the product water phase on the bottom of the container.

Example VIII

A product mixture produced from the thermo-catalytic pyrolysis of southern yellow pine wood chips was collected and allowed to settle. The organic phase (raw bio-oil) for the product mixture settled to a position below the water phase, and had a TAN of 6.1. A 20.1 gram quantity of ammonium bicarbonate was combined with an 82 gram quantity of process water separated from the product mixture to form a modified water solution containing about 19.7 wt % ammonium bicarbonate. A 19.9 gram quantity of the modified water solution was combined with 91 grams of the raw bio-oil separated from the product mixture. The organic phase (raw bio-oil) layer was flipped and on top, with the modified water phase on the bottom of the container.

Example IX

Raw bio-oil was separated from a product mixture produced from the thermo-catalytic pyrolysis of southern yellow pine wood chips. The raw bio-oil had a TAN of 6.1; 3.2 vol % water (determined by the Karl Fischer titration method); and 5,000 ppm solids. A quantity of the raw bio-oil was blended with a quantity of a bio-naphtha fraction separated from the raw bio-oil by distillation to form a 50/50 blend (by volume). The 50/50 blend contained about 4.0 wt % BS&W (basic sediment and water). A quantity of the 50/50 blend was centrifuged, removing a major portion of the free water and solids, amounting to about 3 wt %, resulting in a centrifuged blend containing about 1.0 wt % BS&W. A quantity of the centrifuged blend was then neutralized with a 3 wt % NaOH aqueous solution to reduce the TAN to about 0 (no TAN measurable). For maximum dehydration, the neutralized blend was also treated at 2.5 kV/inch AC electricity following addition of 100 ppm of a demulsifier obtained from Croda, commercially available under the trade name Croda D510. The resulting neutralized blend contained about 0 wt % (trace) BS&W. Each of the 50/50 blend, the centrifuged blend, and the neutralized blend were tested for conductivity at various temperatures. Results of such tests are shown in Table 2 below.

TABLE 2

|  | "As Is" 50/50 Blend | Centrifuged Blend | Neutralized and Electrostatically Treated Blend |
|---|---|---|---|
| BS&W | ~4% | ~1% | ~0% |
| Temp. (F.) | Specific Conductivity (nS/m) | | |
| 80 | 1,150,000 | 296,667 | — |
| 90 | — | — | 67,333 |
| 120 | | 373,333 | 88,667 |
| 160 | | 502,000 | 120,667 |
| 200 | | 590,000 | 139,333 |
| 240 | | 702,667 | 140,667 |
| 280 | | 826,667 | 133,333 |

As can be seen from the data in Table 2, the addition of a neutralizing base to the bio-oil/bio-naphtha blend, along with electrostatic treatment, results in a significant decrease in conductivity. Thus, rather than leading to an expected increase in conductivity, it was unexpectedly found that the addition of a base to the system actually reduced the conductivity.

Example X

Raw bio-oil was separated from a product mixture produced from the thermo-catalytic pyrolysis of southern yellow pine wood chips. A quantity of the raw bio-oil was blended with a quantity of an un-hydrotreated bio-naphtha fraction of the raw bio-oil to form a 50/50 blend (by volume), which was then stirred for 1 hour at 300 RPM. For each of the acid treatment tests, an 80 ml quantity of the blend was mixed with 20 ml of an aqueous acid solution, and blended for 15 seconds. The aqueous acid solutions were prepared by mixing the acids into process water produced in the thermo-catalytic pyrolysis of the wood chips. As a control, one of the tested samples was prepared using process water without added acid. The samples were placed in a 140 F water bath for 30 minutes. The samples were then filtered through a 0.2 µm PVDF membrane filter and tested for metals using inductively coupled plasma mass spectrometry (ICP-MS). The metals content results are shown in Table 3 below.

TABLE 3

| Metal | Raw Bio-oil | 5% Sulfuric Acid | 5% Phosphoric Acid | Blank (No added Acid) | 5% Nitric Acid | 5% Glycolic Acid |
|---|---|---|---|---|---|---|
| Al | 98.5 | 0 | 1.147 | 8.27 | 0.1339 | 2.998 |
| Ca | 69 | 0.56 | 0.797 | 0.4383 | 0.4059 | 1.129 |
| Cl | 0.749 | 0.2386 | 0.3886 | 0.563 | 0.3327 | 0.2361 |
| Co | 0.0427 | 0.0705 | 0.1086 | 0.1128 | 0 | 0.0847 |
| Cr | 0.3501 | 0 | 0.0102 | 0 | 0.003 | 0.0063 |
| Cu | 0.1094 | 0 | 0.032 | 0.0556 | 0.0371 | 0.032 |
| Fe | 12.33 | 0.0507 | 0.2298 | 4.615 | 0.596 | 2.287 |
| K | 14.07 | 0.0057 | 0.0665 | 0.0096 | 0.0132 | 0.0354 |
| Mg | 20.71 | 0 | 0.0176 | 0.0092 | 0 | 0.012 |
| Mn | 8.44 | 0.2603 | 0.0999 | 0.0941 | 0 | 0.0043 |
| Mo | 0.0143 | 0 | 0.0222 | 0 | 0 | 0 |
| Na | 1.16 | 2.999 | 12.19 | 3.195 | 0.2063 | 3.083 |
| Ni | 0.1241 | 0.0507 | 0.0516 | 0.0395 | 0.0596 | 0.0654 |
| P | 64.3 | 0.3506 | 1.731 | 0.723 | 1.168 | 0.512 |
| S | 9.66 | 0 | 0 | 0 | 0 | 0 |
| Si | 9.68 | 0.0581 | 0.0597 | 0.0668 | 0 | 0 |
| Ti | 2.237 | 0.562 | 0.2747 | 0.809 | 0 | 0.562 |
| V | 3.139 | 0 | 0.2057 | 1.468 | 0.0351 | 1.444 |
| Zn | 1.269 | 0.0249 | 0.0634 | 0.182 | 0.0126 | 0.2116 |
| Total Metals | 315.885 | 5.2311 | 17.4955 | 20.6509 | 3.0034 | 12.7028 |

As can be seen from the test results in Table 3, contacting bio-oil, which contains metals, with an aqueous acid solution including the above acids results in a substantial lowering of the wt % of dissolved metals in the resulting treated bio-oil.

Example XI

Parameters of potential extraction solvents were evaluated for use in liquid-liquid extraction of bio-oil/water mixtures. Table 4 below sets out certain properties of four different solvents. As can be seen in Table 4, methyl isobutyl ketone (MIBK) and cyclopentyl methyl ether (CPME) have desirable properties for such liquid-liquid extraction, however, the use of cyclopentyl methyl ether is less desirable due to its high cost.

TABLE 4

| Parameter | Ethyl Ether | Ethyl Acetate | MIBK | CPME |
|---|---|---|---|---|
| Density (g/ml) | 0.713 | 0.897 | 0.800 | 0.860 |
| Boiling Point (° F.) | 94 | 171 | 241 | 223 |
| Solubility in Water (g/100 ml) | 6.9 | 8.3 | 1.8 | 1.1 |
| Dipole Moment (Debye) | 1.15 | 1.78 | 4.2 | 1.27 |
| Stability in Acidic conditions | Less stable, forms peroxides | Hydrolyzes to acetic acid and ethanol | Stable | Less stable, forms peroxides |
| Commercially available/Cost | Yes/Limited applicability due to excess volatility | Yes, $1850/MT | Yes, $2200/MT | No, Expensive specialty |

Example XII

A product mixture produced from the thermo-catalytic pyrolysis of southern yellow pine wood chips was collected and allowed to settle into an oil phase and a process water phase. The process water phase was separated from the oil phase. The process water phase was then extracted with MIBK and produced a raffinate and an extract. MIBK was then separated (by distillation) from the extract which formed recovered MIBK and a residue which was not solid but an oily liquid material. The results for the process water extraction are shown in Table 5 below. The recovered MIBK quantity was 35.9 grams less than the amount of MIBK added to the process water. It is assumed that most of the overall mass loss of 21.30 g was from MIBK. Assuming 21 g of MIBK were lost due to volatility, that leaves about 14.9 g of MIBK to account for. With a water solubility of 1.8 g/100 ml, the amount of MIBK in the raffinate is calculated as follows:

(749.3 g water)×(1 ml/g)×(1.8 g MIBK/100 ml water)≅13.5 g MIBK. This leaves ~1.4 g MIBK (14.9 g−13.5 g) in the residue.

TABLE 5

| | Mass Fraction | Carbon Mass in each fraction | Estimated organic compounds mass | Estimated pure water mass |
|---|---|---|---|---|
| Process Water (g) | 1013.6 | 123.9 | 229.2 | 784.4 |
| MIBK (g) | 528.4 | 380.4 | 528.4 | 0 |
| Total mass added (g) | 1542.0 | 504.3 | 757.5 | 784.4 |
| Raffinate (g) | 924.1 | 74.9 | 174.8 | 749.3 |
| Residue (g) | 94.6 | 62.7 | 94.1 | 0.5 |
| Recovered MIBK and volatiles (g) | 498.9 | 323.1 | 492.5 | 6.4 |
| Water separated from extract (g) | 3.1 | 0.2 | — | 3.1 |
| Final Total (g) | 1520.7 | 460.8 | 761.5 | 759.2 |
| % Recovery | 98.6 | 91.4 | 100.5 | 96.8 |
| Mass lost (g) | 21.3 | — | — | — |

As can be seen from the results in Table 5, a significant quantity of carbon containing compounds can be removed from the process water by extraction with MIBK and substantially all of the MIBK is recoverable from the process. Further quantities of MIBK can easily be recovered from the raffinate and/or the residue. Also, the wt % yield of residue from the organics present in the initial process water is calculated to be: 100×(94.1 g−1.4 g MIBK)/(229.2 g organics in the process water) ~40 wt %.

Example XIII

A product mixture produced from the thermo-catalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. The results for the total product mixture extraction are shown in Table 6 below. The recovered MIBK quantity was 78.9 grams less than the amount of MIBK added to the process water. It is assumed that most of the overall mass loss of 50.9 g was from MIBK. Assuming 50 g of MIBK were lost due to volatility, that leaves about 28.9 g of MIBK to account for. With a water solubility of 1.8 g/100 ml, the amount of MIBK in the raffinate is calculated as follows:

(677.5 g water)×(1 ml/g)×(1.8 g MIBK/100 ml water)≅12.2 g MIBK. This leaves ~16.7 g MIBK (28.9 g−12.2 g) in the residue.

substantially all of the MIBK is recoverable from the process. Further quantities of MIBK can easily be recovered from the raffinate and/or the residue. Also, the wt % yield of organics from the organics present in the initial process water portion of the total product mixture is calculated to be: 100×(176.7 g residue−98.9 g organics in process oil−16.7 g MIBK in residue)/(205 g organics in the process water)~30 wt %.

Example XIV

Thermal stability of the bio-oil product is an extremely important processing parameter, since changes in the chemical and physical composition by thermal stress may create chemical changes (polymerization), viscosity changes and plugging issues (solids formation) in the upgrading units (such as hydrotreating units). A high oxygen product mixture produced from the thereto-catalytic pyrolysis of southern yellow pine wood chips was collected and allowed to settle, and a bio-oil stream was obtained. Also, a portion of the total product mixture was then extracted with MIBK and produced a raffinate and an extract. MIBK was then separated (by distillation) from the extract which formed recovered MIBK and a residue which was not solid but an oily liquid material. The resulting bio-oil stream and residue were separately subjected to a thermal stability study by heating the extracted oil in autoclave tubes, purged with Argon gas and immersed in a heated oil bath for 1 hr and 5 hrs, which is a more than typical residence time in heat exchangers and separation tanks. Table 7 shows results from the thermal stability test of the bio-oil stream and the residue.

TABLE 6

|  | Mass Fraction | Carbon Mass in each fraction | Estimated organic compounds mass | Estimated pure water mass |
|---|---|---|---|---|
| Process Water (g) | 906.7 | 110.8 | 205.0 | 701.7 |
| Process Oil (g) | 109.0 | 74.2 | 98.9 | 10.0 |
| Process Water/Oil (g) | 1015.6 | 185.0 | 303.9 | 711.7 |
| MIBK (g) | 476.8 | 343.3 | 476.8 | 0.0 |
| Total mass added (g) | 1492.5 | 528.3 | 780.7 | 711.7 |
| Raffinate (g) | 838.4 | 67.0 | 160.9 | 677.5 |
| Residue (g) | 177.4 | 128.1 | 176.7 | 0.7 |
| Recovered MIBK and volatiles (g) | 425.8 | 299.6 | 397.9 | 27.9 |
| Final Total (g) | 1441.6 | 494.6 | 735.5 | 706.1 |
| % Recovery | 96.6 | 93.6 | 94.2 | 99.2 |
| Mass lost (g) | 50.9 | — | — | — |

As can be seen from the results in Table 6, a significant quantity of carbon containing compounds can be removed from the total product mixture by extraction with MIBK and

TABLE 7

|  | Bio-Oil Stream | Bio-Oil Stream Heated 1 hr | Bio-Oil Stream Heated 5 hrs | Residue | Residue Heated 1 hr | Residue Heated 5 hrs |
|---|---|---|---|---|---|---|
| Density, 60° F., g/cm$^3$ | 1.117 | 1.119 | 1.128 | 1.112 | 1.112 | 1.115 |
| Carbon, wt % | 68.14 | 68.18 | 67.58 | 72.18 | 71.54 | 71.50 |
| Hydrogen, wt % | 7.35 | 7.54 | 7.61 | 7.69 | 7.81 | 7.68 |
| Nitrogen, wt % | 0.22 | 0.19 | 0.23 | 0.19 | 0.29 | 0.17 |
| Water, wt % | 9.22 | 8.16 | 7.46 | 0.39 | 0.95 | 1.85 |
| Oxygen (dry basis), wt % | 17.73 | 18.33 | 19.40 | 19.67 | 19.70 | 19.37 |

TABLE 7-continued

| | Bio-Oil Stream | Bio-Oil Stream Heated 1 hr | Bio-Oil Stream Heated 5 hrs | Residue | Residue Heated 1 hr | Residue Heated 5 hrs |
|---|---|---|---|---|---|---|
| TAN, mg KOH/g | 80.46 | 80.83 | 51.86 | 102.8 | 95.86 | 70.69 |
| Viscosity, 25° C., cP | 110 | 214 | 621 | 1462 | 1540 | 2403 |
| Viscosity change | — | 94.4% | 465% | — | 5.3% | 64.4% |

As can be seen from Table 7, the % viscosity change for the MIBK produced residue is significantly lower than that for the bio-oil stream. This demonstrates a significant increase in stability for the residue over that for the typical bio-oil stream which has not been subjected to extraction. The initial viscosity of the residue is higher than that for the bio-oil stream due to the substantial absence of water and light (C1-C4) carbon containing compounds which are removed during the MIBK extraction.

Example XV

A product mixture produced from the thermo-catalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. The extract was then subjected to spinning/band distillation for separation of the residue from the MIBK. The results of such distillation are shown in Table 8 below. The results in Table 8 demonstrate that substantially all of the MIBK is removable from the extract.

TABLE 8

| Temp (° F.) | Fraction Collected | % MIBK distribution |
|---|---|---|
| 153.0 | 1 | 0.11 |
| 173.0 | 2 | 0.66 |
| 175.0 | 3 | 0.17 |
| 190.0 | 4 | 0.85 |
| 236.5 | 5 | 3.55 |
| 241.8 | 6 | 3.56 |
| 241.3 | 7 | 3.92 |
| 242.5 | 8 | 4.01 |
| 241.2 | 9 | 7.44 |
| 241.3 | 10 | 7.48 |
| 242.6 | 11 | 7.36 |
| 242.9 | 12 | 7.27 |
| 242.1 | 13 | 7.27 |
| 242.9 | 14 | 7.46 |
| 242.9 | 15 | 7.53 |
| 238.0 | 16 | 21.79 |
| 236.0 | 17 | 5.36 |
| | Residue Pot | 1.62 |
| | Recovery | 97.42 |

Example XVI

A product mixture produced from the thermo-catalytic pyrolysis of southern yellow pine wood chips was collected. The total product mixture was then extracted with MIBK and produced a raffinate 1 and an extract. MIBK was then separated (by distillation) from the extract which formed recovered MIBK and a residue which was not solid but an oily liquid material. The resulting raffinate 1 was then subjected to an extraction with MIBK to form a raffinate 2. The resulting raffinate 2 was then subjected to an extraction with MIBK to form a raffinate 3. The resulting raffinate 3 was then subjected to an extraction with MIBK to form a raffinate 4. The results of the extractions are shown in Table 9 below which shows that the low molecular weight oxygenate compounds (C1-C4) such as formaldehyde, acetaldehyde, butanone, acetic and propanoic acids and hydroxypropanone, are very soluble in water so they tend to stay in the water after MIBK extraction. This is preferred since hydrotreating such compounds would form C1-C4 alkanes that would end up in the gas phase. This would result in hydrogen consumption without the benefit of increasing renewable fuel yield.

TABLE 9

| | | Raffinate | | | |
|---|---|---|---|---|---|
| Compound | Process Water | 1 | 2 | 3 | 4 |
| Formaldehyde, wt % | 4.05 | 4.50 | 4.14 | 4.40 | 4.15 |
| Acetaldehyde, wt % | 1.28 | 0.88 | 0.56 | 0.53 | 0.38 |
| 2-Cyclopenten-1-one, wt % | 0.13 | 0 | 0 | 0.04 | 0 |
| Butanal, wt % | 0.03 | 0.10 | 0 | 0 | 0 |
| 2-Butanone, wt % | 0.20 | 0.12 | 0 | 0 | 0 |
| 3-Buten-2-one, wt % | 0.16 | 0.14 | 0.12 | 0.12 | 0.11 |
| Furfural, wt % | 0.07 | 0 | 0 | 0 | 0 |
| Methyl Isobutyl Ketone, wt % | 0.00 | 2.10 | 1.87 | 1.86 | 1.66 |
| Acetic Acid, wt % | 5.23 | 4.99 | 3.89 | 3.53 | 2.66 |
| Propanoic Acid, wt % | 0.79 | 0.49 | 0.27 | 0.16 | 0 |
| 1-Hydroxy-2-Propanone, wt % | 1.91 | 2.08 | 1.87 | 1.90 | 1.63 |

Example XVII

A product mixture produced from the thermo-catalytic pyrolysis of southern yellow pine wood chips was collected. The total product mixture was then extracted with MIBK and produced a raffinate 1 and an extract. The resulting raffinate 1 was then subjected to an extraction with MIBK to form a raffinate 2. The resulting raffinate 2 was then subjected to an extraction with MIBK to form a raffinate 3. Each of the extractions were at a volume ratio of MIBK to water of 25:75. Tables 10A-10C show partition coefficients for various components between the MIBK extract and the water which were calculated for raffinates 1 and 3 in accordance with the following: $K_d = [wt \%]_{MIBK\ Extract} / [Wt \%]_{Raffinate}$. Values indicated as ">6" or ">5" are due to limits of detection of the GC/MS Analysis. The calculated $K_d$ values demonstrate that the lighter components such as formaldehyde, acetaldehyde, acetic acid and 1-hydroxy-2-propanone preferentially stay with the water (raffinate).

TABLE 10A

| Organic Compounds | $K_d$ 1st Extraction | $K_d$ 3rd Extraction |
|---|---|---|
| Formaldehyde | 0.16 | 0.01 |
| Acetaldehyde | 0.07 | 0.09 |
| 2-MethylFuran | >6 | >5 |
| 2-Cyclopenten-1-one | 19.34 | 1.65 |

TABLE 10A-continued

| Organic Compounds | $K_d$ 1st Extraction | $K_d$ 3rd Extraction |
|---|---|---|
| 2,5-Dihydrofuran | 6.00 | >5 |
| Butanal | 0.58 | >5 |
| 2-Butanone | 3.14 | 7.19 |
| Benzene | >6 | >5 |
| 3-Buten-2-one | 1.29 | 0.44 |
| 2,5-Dimethyl-Furan | >6 | >5 |
| Furfural | 17.50 | >5 |
| 2-Pentanone | 10.05 | 8.79 |
| Toluene | >6 | >5 |
| 2,3-Pentanedione | 6.21 | >5 |
| 5-HydroxymethylFurfural | >6 | >5 |
| Methyl Isobutyl Ketone | 37.83 | 51.33 |
| Acetic Acid | 0.68 | 0.67 |
| Ethylbenzene | >6 | >5 |
| (p + m)-Xylene | >6 | >5 |
| Propanoic Acid | 2.13 | 2.63 |
| o-Xylene | >6 | >5 |
| 1-Hydroxy-2-Propanone | 0.29 | 0.16 |
| Styrene | >6 | >5 |
| Isopropylbenzene | >6 | >5 |
| n-Propylbenzene | >6 | >5 |
| 2-Methyl-2-cyclope | 7.50 | >5 |
| 3-Ethyltoluene | >6 | >5 |
| 4-Ethyltoluene | >6 | >5 |
| 1,3,5-Trimethylbenzene | >6 | >5 |
| 2-Ethyltoluene | >6 | >5 |
| 1,2,4-Trimethylbenzene | >6 | >5 |
| Isobutyl benzene | >6 | >5 |
| 1,3-Benzodioxole | >6 | >5 |
| Benzofuran | >6 | >5 |

TABLE 10B

| Organic Compounds | $K_d$ 1st Extraction | $K_d$ 3rd Extraction |
|---|---|---|
| 1,2,3-Trimethylbenzene | >6 | >5 |
| Indane | >6 | >5 |
| Benzaldehyde | >6 | >5 |
| Indene | >6 | >5 |
| Phenol | 48.66 | >5 |
| 2,3-Dihydrobenzofuran | >6 | >5 |
| 2-Methylphenol | 12.08 | >5 |
| 2-ethyl-Phenol | >6 | >5 |
| 2-methyl-Benzofuran | >6 | >5 |
| 2-Methylbenzaldehyde | >6 | >5 |
| (p + m) Cresol | 22.44 | >5 |
| 2-methoxy-Phenol | >6 | >5 |
| 2-Methylindene | >6 | >5 |
| 2,5-dimethyl-Phenol | >6 | >5 |
| 3-ethyl-Phenol | >6 | >5 |
| 2,3-dimethyl-Phenol | >6 | >5 |
| Naphthalene | >6 | >5 |
| 4-ethyl-Phenol | >6 | >5 |
| 3,4-dimethyl-Phenol | >6 | 2.46 |
| 3-Methyl-1,2-benz diol | 32.27 | >5 |
| 2-methyl-Naphthalene | >6 | >5 |
| 1-methyl-Naphthalene | >6 | >5 |
| 1,2-Benzenediol | 18.52 | >5 |
| 2-Ethylnaphthalene | >6 | >5 |
| 4-Methyl-1,2-Benz diol | 119.53 | >5 |
| (+/−)-1-Indanol | >6 | >5 |
| Eugenol | >6 | >5 |
| 2,6-Dimethylnaphthalene | >6 | >5 |
| 4-Ethylcatechol | 30.01 | >5 |
| 1,3-Benzenediol | >6 | >5 |
| 1-Naphthalenol | >6 | >5 |
| Acenaphthene | >6 | >5 |
| Acenaphthylene | >6 | >5 |
| 1,4-Benzenediol | 30.85 | >5 |
| 2-Naphthalenol | >6 | >5 |
| Fluorene | >6 | >5 |
| 2-Methyl-1-naphthol | >6 | >5 |

TABLE 10C

| Organic Compounds | $K_d$ 1st Extraction | $K_d$ 3rd Extraction |
|---|---|---|
| Anthracene | >6 | >5 |
| Phenanthrene | >6 | >5 |
| Fluoranthene | >6 | >5 |
| Pyrene | >6 | >5 |
| Benz[a]anthracene | >6 | >5 |
| Chrysene | >6 | >5 |
| Benzo[b]fluoranthene | >6 | >5 |
| Benzo[k]fluoranthene | >6 | >5 |
| Benzo[a]Pyrene | >6 | >5 |
| Indeno[1,2,3-cd]pyrene | >6 | >5 |
| Benzo[ghi]perylene | >6 | >5 |
| Dibenz[a,h]anthracene | >6 | >5 |
| Levoglucosan | >6 | >5 |

Example XVIII

A low oxygen product mixture produced from the thermo-catalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. Concentrations of volatile organic components were measured using GC/MS for the product mixture and for the raffinate. Also, % C was also determined for such components. The results for the C1-C4 volatile organic components are shown in Table 11 below, and the results for the C5+ volatile organic components are shown in Tables 12A and 12B below. In addition, the total carbon content of the product mixture was analyzed and found to be 3.78 wt % C. By subtraction, the total amount of carbon from non-volatile organic components was 0.37 wt %.

TABLE 11

| | Product Mixture, wt % | Product Mixture, % C | Raffinate, wt % | Raffinate, % C |
|---|---|---|---|---|
| Formaldehyde | 0.39 | 0.15 | 0.54 | 0.22 |
| Acetaldehyde | 0.31 | 0.17 | 0.14 | 0.07 |
| 2-Cyclopenten-1-one | 0.03 | 0.02 | 0.00 | 0.00 |
| 2-Butanone | 0.02 | 0.01 | 0.00 | 0.00 |
| 3-Buten-2-one | 0.02 | 0.01 | 0.00 | 0.00 |
| Toluene | 0.01 | 0.00 | 0.00 | 0.00 |
| Methyl Isobutyl Ketone | 0.00 | 0.00 | 2.02 | 1.46 |
| Acetic Acid | 2.08 | 0.83 | 2.85 | 1.14 |
| (p + m)-Xylene | 0.01 | 0.00 | 0.00 | 0.00 |
| Propanoic Acid | 0.17 | 0.08 | 0.09 | 0.04 |
| 1-Hydroxy-2-Propanone | 0.05 | 0.02 | 0.00 | 0.00 |
| Total C4− volatiles | 3.09 | 1.29 | 5.64 | 2.93 |

TABLE 12A

| | Product Mixture, wt % | Product Mixture, % C | Raffinate, wt % | Raffinate, % C |
|---|---|---|---|---|
| 2-Methyl-2-cyclope | 0.01 | 0.01 | 0.00 | 0.00 |
| 4-Ethyltoluene | 0.01 | 0.00 | 0.00 | 0.00 |
| 1,2,4-Trimethylbenzene | 0.01 | 0.00 | 0.00 | 0.00 |
| Benzofuran | 0.01 | 0.00 | 0.00 | 0.00 |
| Indane | 0.01 | 0.00 | 0.00 | 0.00 |
| Indene | 0.01 | 0.00 | 0.00 | 0.00 |

TABLE 12A-continued

|  | Product Mixture, wt % | Product Mixture, % C | Raffinate, wt % | Raffinate, % C |
|---|---|---|---|---|
| Phenol | 0.53 | 0.40 | 0.00 | 0.00 |
| 2-Methylphenol | 0.15 | 0.12 | 0.00 | 0.00 |
| 2-ethyl-Phenol | 0.01 | 0.01 | 0.00 | 0.00 |
| 2-methyl-Benzofuran | 0.01 | 0.00 | 0.00 | 0.00 |
| (p + m) Cresol | 0.33 | 0.26 | 0.00 | 0.00 |
| 2-Methylindene | 0.01 | 0.00 | 0.00 | 0.00 |

TABLE 12B

|  | Product Mixture, wt % | Product Mixture, % C | Raffinate, wt % | Raffinate, % C |
|---|---|---|---|---|
| 2,5-dimethyl-Phenol | 0.07 | 0.06 | 0.00 | 0.00 |
| 3-ethyl-Phenol | 0.01 | 0.01 | 0.00 | 0.00 |
| 2,3-dimethyl-Phenol | 0.01 | 0.00 | 0.00 | 0.00 |
| Naphthalene | 0.01 | 0.00 | 0.00 | 0.00 |
| 4-ethyl-Phenol | 0.04 | 0.03 | 0.00 | 0.00 |
| 3,4-dimethyl-Phenol | 0.02 | 0.01 | 0.00 | 0.00 |
| 3-Methyl-1,2-benz diol | 0.16 | 0.10 | 0.00 | 0.00 |
| 2-methyl-Naphthalene | 0.03 | 0.02 | 0.00 | 0.00 |
| 1,2-Benzenediol | 0.87 | 0.57 | 0.00 | 0.00 |
| 2-Ethylnaphthalene | 0.01 | 0.00 | 0.00 | 0.00 |
| 4-Methyl-1,2-Benz diol | 0.25 | 0.17 | 0.00 | 0.00 |
| 2,6-Dimethylnaphthalene | 0.03 | 0.02 | 0.00 | 0.00 |
| 4-Ethylcatechol | 0.09 | 0.06 | 0.00 | 0.00 |
| 1,3-Benzenediol | 0.03 | 0.02 | 0.00 | 0.00 |
| 1,4-Benzenediol | 0.15 | 0.10 | 0.00 | 0.00 |
| 2-Naphthalenol | 0.02 | 0.02 | 0.00 | 0.00 |
| 2,2-Bifuran | 0.04 | 0.03 | 0.00 | 0.00 |
| Methacrolein | 0.00 | 0.00 | 0.00 | 0.00 |
| 3-Pentanone | 0.00 | 0.00 | 0.00 | 0.00 |
| 2,5-Dihydrotoluene | 0.00 | 0.00 | 0.00 | 0.00 |
| 3-Penten-2-one | 0.00 | 0.00 | 0.00 | 0.00 |
| Cyclopentanone | 0.00 | 0.00 | 0.00 | 0.00 |
| Benzofuran, 7-methyl | 0.01 | 0.00 | 0.00 | 0.00 |
| 1-Methylindene | 0.01 | 0.01 | 0.00 | 0.00 |
| 1H-Indenol | 0.08 | 0.07 | 0.00 | 0.00 |
| Penten-3-one | 0.00 | 0.00 | 0.00 | 0.00 |
| 1,3-Dimethylindene | 0.01 | 0.00 | 0.00 | 0.00 |
| 2-Ethyl-5-methylphenol | 0.03 | 0.02 | 0.00 | 0.00 |
| Retene | 0.01 | 0.00 | 0.00 | 0.00 |
| Total C5+ volatiles | 3.09 | 2.12 | 0.00 | 0.00 |
| Total volatiles | 6.18 | 3.41 | 5.64 | 2.93 |

As can be seen in Tables 11, 12A and 12B the data show that extraction of a biomass derived product mixture with MIBK is effective in removing C5+ volatile organic components from water. Specifically, while the product mixture contained 2.12 wt % C from C5+ organic volatiles, the raffinate contained at or near 0 wt % C from C5+ organic volatiles showing clear partitioning from the water phase to the oil phase. Also, the wt % C from C1-C4 volatile organic components is concentrated in the raffinate at 2.93 wt % as compared to only 1.29 wt % in the initial product mixture.

While the technology has been particularly shown and described with reference to specific embodiments, it should be understood by those skilled in the art that various changes in form and detail may be made without departing from the spirit and scope of the technology as defined by the appended claims.

That which is claimed is:

1. A method comprising:
    a) contacting an extraction solvent with a first mixture, thereby forming a second mixture comprising an extract and a raffinate,
    wherein said first mixture comprises process water separated from reaction products comprising bio-oil and said process water produced from catalytic conversion of biomass at temperatures ranging from 300° C. to 1000° C., and wherein said process water comprises water and biomass derived carbon containing compounds including organics A and organics B, and further wherein:
        said organics A comprise compounds selected from the group consisting of i) aldehydes, ii) ketones having from 3 to 4 carbon atoms per molecule, iii) carboxylic acids having from 2 to 3 carbon atoms per molecule, and iv) combinations thereof,
        said organics B comprise compounds having at least four carbon atoms per molecule wherein said organics B are substantially free of: i) aldehydes, ii) ketones having from 3 to 4 carbon atoms per molecule, and iii) carboxylic acids having from 2 to 3 carbon atoms per molecule,
        said extract and said raffinate are immiscible,
        said extract comprises substantially all of said extraction solvent and substantially all of said organics B,
        said raffinate comprises substantially all of said water and substantially all of said organics A, and
        said extraction solvent has a dipole moment greater than about 1.0 debye, a density less than about 1.0, a water solubility at 20° C. of less than about 2.5 g/100 ml of water, and a boiling point in the range of from about 90 to about 300° F.;
    b) separating said second mixture thereby forming an intermediate product stream comprising at least a portion of said extract and a waste water stream comprising substantially all of said raffinate, wherein said wastewater stream comprises less than about 0.1 wt % of said organics B; and
    c) removing at least a portion of said extraction solvent from said intermediate product stream forming a recovered extraction solvent and a bio-oil product.

2. The method of claim 1 wherein the viscosity of said second mixture is lower than the viscosity of said first mixture, wherein said second mixture further comprises solids, and wherein at least a portion of said solids are removed from said second mixture by filtration prior to said step b).

3. The method of claim 1 wherein the partition coefficients of said organics A for said extract and said raffinate are each less than about 1.0, and wherein the partition coefficients of said organics B for said extract and said raffinate are each greater than about 1.0.

4. The method of claim 1 wherein said recovered extraction solvent is recycled as at least a part of said extraction solvent in step a).

5. The method of claim 1 wherein said bio-oil product comprises less than about 1.0 wt % of said organics A.

6. The method of claim 1 wherein said bio-oil of said reaction products comprises at least about 8 wt % water and wherein said bio-oil product comprises less than about 1 wt % water.

7. The method of claim 1 wherein said carbon containing compounds of said organics B are selected from the group consisting of ketones, furans, phenols, catechols, aromatic hydrocarbons, indenols, indanols, naphthalenos, benzofurans, and combinations thereof.

8. The method of claim 1 wherein said extraction solvent comprises a member selected from the group consisting of methyl isobutyl ketone, cyclopentyl methyl ether, and combinations thereof.

9. The method of claim 1 wherein said extraction solvent comprises methyl isobutyl ketone.

10. The method of claim 1 wherein said intermediate product stream comprises substantially all of said extract.

11. The method of claim 1 wherein said first mixture is counter-currently contacted with said extraction solvent in step a).

12. The method of claim 1 wherein said first mixture is cross-currently contacted with said extraction solvent in step a).

13. The method of claim 1 wherein the contacting of said first mixture with said extraction solvent in step a) forms a static mixture, and wherein the separation of said second mixture in step b) is by decanting.

14. The method of claim 1 wherein said extraction solvent is substantially unreactive when exposed to acidic aqueous media and is substantially thermally stable at temperatures up to about 500° F.

15. The method of claim 1 wherein said extraction solvent comprises cyclopentyl methyl ether.

16. A method comprising:
  a) providing a first mixture comprising reaction products produced from catalytic conversion of biomass at temperatures ranging from 300° C. to 1000° C., said reaction products comprising water and biomass derived carbon containing compounds including organics A and organics B, wherein:
    said organics A comprise carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof; and
    said organics B comprise carbon containing compounds having at least four carbon atoms per molecule, wherein said organics B are substantially free of said organics A, and
    wherein said first mixture includes i) a first oil phase comprising at least a portion of said biomass derived carbon containing compounds and at least a portion of said water and ii) a first aqueous phase comprising at least a portion of said water and at least a portion of said biomass derived carbon containing compounds, wherein said first oil phase and said first aqueous phase are immiscible;
  b) contacting said first mixture with an extraction solvent thereby forming an extraction mixture comprising an extraction oil phase and an extraction aqueous phase; wherein:
    substantially all of said organics A present in said first oil phase are partitioned from said first oil phase to said first aqueous phase and substantially all of said organics B present in said first aqueous phase are partitioned from said first aqueous phase to said first oil phase, thereby forming (I) said extraction oil phase comprising substantially all of said organics B and substantially all of said extraction solvent, and (II) said extraction aqueous phase comprising substantially all of said water and substantially all of said organics A,
    said extraction oil phase and said extraction aqueous phase are immiscible, and
    said extraction solvent has a dipole moment greater than about 1.0 debye, a density less than about 1.0, a water solubility at 20° C. of less than about 2.5 g/100 ml of water, and a boiling point in the range of from about 90 to about 300° F.; and
  c) separating said extraction mixture thereby forming an intermediate product stream comprising at least a portion of said extraction oil phase and a waste water stream comprising substantially all of said extraction aqueous phase, wherein said waste water stream comprises less than about 0.1 wt % of said organics B.

17. The method of claim 16 wherein at least a portion of said extraction solvent is removed from said intermediate product stream forming a recovered extraction solvent and a bio-oil product.

18. The method of claim 17 wherein said recovered extraction solvent is recycled as at least a part of said extraction solvent in step b).

19. The method of claim 17 wherein said bio-oil product comprises less than about 1.0 wt % of said organics A.

20. The method of claim 17 wherein said first oil phase comprises at least about 8 wt % water and wherein said bio-oil product comprises less than about 1 wt % water.

21. The method of claim 16 wherein the viscosity of said extraction mixture is lower than the viscosity of said first mixture, wherein said extraction mixture further comprises solids, and wherein at least a portion of said solids are removed from said extraction mixture by filtration prior to said step c).

22. The method of claim 16 wherein the partition coefficients of said organics A for said extraction oil phase and said extraction aqueous phase are each less than about 1, and wherein the partition coefficients of said organics B for said extraction oil phase and said extraction aqueous phase are each greater than about 1.

23. The method of claim 16 wherein said carbon containing compounds of said organics B are selected from the group consisting of Ketones, Furans, Phenols, Catechols, Aromatics hydrocarbons, Indenols, Indanols, Naphthalenos, Benzofurans, and combinations thereof.

24. The method of claim 16 wherein said extraction solvent comprises a member selected from the group consisting of methyl isobutyl ketone, cyclopentyl methyl ether, and combinations thereof.

25. The method of claim 16 wherein said extraction solvent comprises methyl isobutyl ketone.

26. The method of claim 16 wherein said intermediate product stream comprises substantially all of said extraction oil phase.

27. The method of claim 16 wherein said first mixture is counter-currently contacted with said extraction solvent in step b).

28. The method of claim 16 wherein said first mixture is cross-currently contacted with said extraction solvent in step b).

29. The method of claim 16 wherein the contacting of said first mixture with said extraction solvent in step b) forms a static mixture, and wherein the separation of said extraction mixture in step c) is by decanting.

30. The method of claim 16 wherein said extraction solvent is substantially unreactive when exposed to acidic aqueous media and is substantially thermally stable at temperatures up to about 500° F.

31. The method of claim 16 wherein said extraction solvent comprises cyclopentyl methyl ether.

* * * * *

UNITED STATES PATENT AND TRADEMARK OFFICE
CERTIFICATE OF CORRECTION

| | | |
|---|---|---|
| PATENT NO. | : 9,387,415 B2 | Page 1 of 1 |
| APPLICATION NO. | : 13/889105 | |
| DATED | : July 12, 2016 | |
| INVENTOR(S) | : Vicente Sanchez, Brent Moore and Ed Smith | |

It is certified that error appears in the above-identified patent and that said Letters Patent is hereby corrected as shown below:

In the Specification:
Column 18, line 18: Delete "thereto-" and replace with -- thermo- --

Signed and Sealed this
Thirtieth Day of August, 2016

Michelle K. Lee
*Director of the United States Patent and Trademark Office*